(12) United States Patent
Stackelberg et al.

(10) Patent No.: US 7,645,480 B2
(45) Date of Patent: Jan. 12, 2010

(54) PROCEDURE FOR REPRODUCTION OF A PHOTOGRAPHIC PICTURE IN AN ARTICLE OF GLASS

(76) Inventors: Ewa Stackelberg, Regeringsgatan 70A, SE-111 39 Stockholm (SE); Nadja Ekman, Katarina Bangata 17, SE-116 39 Stockholm (SE)

( * ) Notice: Subject to any disclaimer, the term of this patent is extended or adjusted under 35 U.S.C. 154(b) by 489 days.

(21) Appl. No.: 10/598,948

(22) PCT Filed: Mar. 21, 2005

(86) PCT No.: PCT/SE2005/000401

§ 371 (c)(1),
(2), (4) Date: Sep. 15, 2006

(87) PCT Pub. No.: WO2005/090254

PCT Pub. Date: Sep. 29, 2005

(65) Prior Publication Data

US 2007/0207264 A1      Sep. 6, 2007

(30) Foreign Application Priority Data

Mar. 22, 2004    (EP) ................................. 0400721

(51) Int. Cl.
*B05D 5/06*     (2006.01)
(52) U.S. Cl. ..................................... 427/162; 427/165

(58) Field of Classification Search ................. 427/165, 427/287, 162
See application file for complete search history.

(56) References Cited

U.S. PATENT DOCUMENTS

| 4,882,301 | A  | * | 11/1989 | Gettys et al. ................... 501/17 |
| 5,269,826 | A  |   | 12/1993 | Leroux et al. |
| 6,187,429 | B1 |   | 2/2001  | Weinberg et al. |
| 6,336,723 | B1 | * | 1/2002  | Nicolin ....................... 347/105 |

FOREIGN PATENT DOCUMENTS

EP    0 778 154 A1    6/1997

OTHER PUBLICATIONS

Database WPI, Week 199247, Derwent Publications Ltd., London, GB; AN 1992-386220 & JP 4285039 A (Sagara K) Oct. 9, 1992, abstract, figure 1.

* cited by examiner

*Primary Examiner*—Roberts Culbert
(74) *Attorney, Agent, or Firm*—Pearne & Gordon LLP

(57) ABSTRACT

The invention relates to a procedure for applying pictures, preferably color pictures, in the surface of a glass article. The pictures are separated by color to make different templates for different colors, e.g. for silk screen printing, or for another method to apply the color on the glass. The colors are then fired according to a schedule of temperature sequences, to get the colors melt into the surface of the glass article to solidity on level with that surface.

21 Claims, No Drawings

PROCEDURE FOR REPRODUCTION OF A PHOTOGRAPHIC PICTURE IN AN ARTICLE OF GLASS

BACKGROUND OF THE INVENTION AND KNOWN TECHNOLOGY

The present invention relates to a procedure for reproduction of a photography in an article of glass. More precisely, the invention concerns a procedure for reproducing coloured pictures, particularly photographies, in an article of glass.

It is already known how to provide a glass-surface with different types of decorations or pictures, e.g. by printing or painting pictures directly on the glas in a manually or mechanized manner. Such methods of applying the pictures however, have the drawback that those have a low durability. Further, such simple applying procedures offer only restricted possibilities of expression, and a lasting high class appearance cannot be attained.

U.S. Pat. No. 5,269,826 describes a process for manufacture of decorated glass-ceramic wares. This process seems in the first instance to be aimed at ceramic hobs, where the wearing out is obvious. Thus, it is desirable to apply a relatively thick layer of paint on the glass surface. This state of the art process comprises a preliminary course of proceeding, which involve a heat treatment of the surface of the glass ware with a Broensted acid at a temperature between 50 and 800° C. Subsequently, the glass is decorated with a ceramic paint, e.g. a commercially available suspension of powder composed of oxides, and with lead borate as a binding agent. Since the pattern has been applied to the article, this will be burned in a kiln. Accordning to the patent, the treatment with Broensted acid results in that the ceramic paint sinks into the glass during the subsequent firing and will cristalize slowly, whereupon the glass surface, despite a thick paint layer, seems relatively even after the firing. This is doubtful seen to the insignificant difference in density between the glass and the ceramic paint, and in respect to the high viscosity of the glass at the firing temperature.

EP-A1 778 154 describes a procedure for multicolour printing on glass and other transparent materials, where the printed picture shall appear luminously transmitting. The printing takes place using a silk screen method and printing ink out of which four colours are used. The inks are intended to dry by use of different physical reactions, out of which drying with visible light during a time of up to 10 seconds is mentioned. No sealing of the ink occur in the glass surface. One more process of multicolour print on a glass surface is known, where the different inks have essentially similar melting points, which are in a temperature range that is uncritical to the glass. The subsequent firing takes place under such a short time as just 2 to 6 minutes and at at temperature of 660° C. at the most. Thus, just the printed ink melt, while the glass remains practically unaffected. The advantage in this known process is that it is rapid and suits well for industrial production.

One problem related to firing ceramic paints on flat standard glass, a so-called float-glass, is the appearance of turbidity on the glass surface and in that way a less transparent glass than before the firing. This phenomenon is denominated coating. It is owing to that the side of float-glass during manufacture lying on the tin bath will be doped with stannous ions. Such ions have an affinity to siliciferous materials like glass, and form the coating.

SUMMARY OF THE INVENTION

The object of the present invention is to accomplish a procedure for reproduction of colour pictures in glass articles, particularly photographies with great wealth of details.

Another object is to realize a procedure for reproduction of colour pictures in a glass article in such a way that the article bearing the picture is colour constant and has a high durability to light.

These objects are achieved by the procedure mentioned in the introduction and that includes the following steps:
  supplying a picture containing one or more colours,
  transferring the picture to one surface of the glass article by way of applying paint of said colour or colours to the surface, and
  firing the article supplied with paint during a defined time at an adjusted temperature, and a highest temperature is reached in the course of this time at which said paint melts into the glass surface.

By way of such a procedure it is possible to produce glass articles with complicated motifs, where the pictures appear completely sealed in the glass, and consequently constitute an integrated part of the glass substance. In this context, it is possible to use paints that are opaque, transparent or semi-transparent. Since the paints melt into the glass the article is very resistant to wearing, i.e. the pictures have the same high surface quality as the glass.

Accordning to one development of the procedure the paints of the picture are during the firing melted completely into the top layer of the glass. Due to that it is assured that after firing all paint constitute an integrated part of the glass. The surface will after the firing not be impaired by any rise caused by the paints, but those have united with the glass to level. However, with suitably designed support the glass can during firing be forced to soften, and thereby emphasize the picture in relivo, depressed or raised.

According to a further development of the invented procedure the firing takes place due to a schedule, which include several consecutive firing sequences, each of which goes on at its specific temperature. The firing sequences can be composed of one introductory relatively long sequence up to a first temperature, one relatively short main sequence at a second temperature, which is higher than the first temperature, and also a finalizing, relatively long sequence at a third temperature, which is lower than the second temperature. Advantageously the said second temperature is at least 700° C., preferably 790° C., and under some circumstances up to 810° C., and in specific cases also upwards.

According to a further development of the procedure said paint or paints include a ceramic agent, so called porcelain enamel, which can stand the mentioned highest temperature. The paint can be opaque, transparent or a mixture of opaque and transparent paints.

According to a further development of the procedure the surface of the bearing glass should be clean in the sense first and foremost free from stannous ions. Thus, the glass must not be formed on a tin bath. (The Pilkington method.) Not either must skimming of any kind exist. In such a way it is possible to achieve a clear glass product with a good transparency. For example the said bearer for the picture can be made of a glass pane, which is manufactured based on to the Pittsburg process, i.e. roller-drawn plate glass.

Accordning to a further development of the procedure the article is during the firing placed on a mould, which has a moulding surface, where the article is oriented on the moulding surface with the paint-dressed surface turned upwards away from the shaping surface. The shaping surface can be even or non-even. In such a way glass articles in many different exterior forms can be manufactured according to the invention.

According to another development of the procedure the said application of ink takes place through printing at the glass surface in one or more steps, using only one specific ink in each printing step. Preferably, at the time of printing the surface of the bases glass is even. By preference the said printing of the picture can take place by means of silk screen printing method. Silk screen printing admits printing on a number of different bases such as paper, glass, enamel and concrete. The method allows printing with opaque inks, transparent inks and semiopaque or colloidal inks.

Accordning to a further development of the procedure the said transfer includes the steps:
  separation of the picture into four different pictures, each on its own film, where everyone of the pictures is intended for one colour, and
  making one printing templet for each of the colours, with the aid of each picture respectively.

Everyone of the films may well be added on anti-scatter grid, for example with the aid of so called stochastic anti-scatter grid, which matches the degree of coarseness and nature of the inks, in particular viscosity and degree of dispersion.

According to a further development of the procedure the said separation include the steps:
  making a black and white negative film for each of the colours, and
  exposure and enlargement of each negative film to a positive one in a size matching the printing templet respectively. Such templets are made for silk screen printing by means of doctor blades technics strippling or sponge stomping.

Accordning to another development of the procedure the application of colour is carried out through spraying of one or several inks on the article surface by means of at least one spray nozzle. Such an application of ink can take place in a common and fast manner with the aid of one spray device, e.g. like an ink-jet printer. In that connection graphics processing first takes place in a manner, per se known, by scanner and a computer with a graphics processing program.

DESCRIPTION OF PREFERRED EMBODIMENTS OF THE INVENTION

The invention is in the following described with respect to preferred embodiments of the procedure for reproducing a colour picture, or colour graphic art, in an article of glass.

The procedure issue from a picture, which can be a photography in black and white or colour, a drawing, a painting or such like which is going to be reproduced in the glass. The picture can have a great wealth of details. Here is described a first execution of the procedure reproduction of a photography by means of printing a picture on glass, with subsequent firing to a final product. Due to a second execution of the procedure the picture can be spray painted on the glass followed by firing to a final product.

In a first production step one separate picture for each colour is made. Four different colours are used, viz the primary colours yellow, red (magenta), blue (cyano-, prussiate) and black. The separation itself is done digitally in a computer having an appropriate graphics processing program, where a print-out in black and white is produced for each and every of the four colours.

An original film for each colour is produced in desired format for the intended picture, e.g. 60×80 cm. This is done with traditional photo-technique and utilization of a process camera. Then the films are placed under anti-scatter grid, and if required, the anti-scatter grid is put in an angle chosen in relation to one of the film edges to aviod annoying pattern formation (moire effect). The anti-scatter grid could suitably be stochastic, which gives a high-grade definition of image. The films could also be produced digitally.

The printing templets are produced by known technics, where the mesh size of the silk screen cloth is chosen from the properties and the inks used.

For printing ceramic inks are used, i.e. so called porcelain enamel, which contain one or more ceramic pigments and a printing-oil. The ceramic inks used, which can be of a type of plumbiferous frit, can stand a high temperature without losing its hue or nuance. Before the printing the pigments are prepared through grinding in a mortar or illing in apebble mll. The pigments are mixed with an appropriate volume of printing-oil (Heraeus Siebdruck—medium No. 218). Advantageously, one type of pigments intended for porcelain painting can be used, e.g. Cebes H 64—four colours series, manufacturer Hereaus. In the described execution of the procedure, four colours are utilized as said above, viz. yellow, red (magenta), blue (cyano-) and black. It should be noted that the black colour can be exchanged to dark brown (H 64 228) or cornflower blue (Hereaus H 64 196) in order to achieve a more nuanced picture.

Accordning to the invention the ink shall be printed on a surface of the glass article. Preferably, the glass constitutes a so called cultural glass, e.g. manufactured according to the Pittsburg process. The glass is a flat glass of appropriate thickness, or at least a glass with one plane surface on which the printing will take place. The glass surface has to be clean from in first instance sannous ions, but must not be free of dust particles. The first printing templet, that is the one exposed with the separated picture for yellow, will be fixed in a frame holder, whereupon the silk screen cloth will be wet and ink is poured on. By the aid of an appropriate implement, e.g. a doctor blade, the ink is spread all over the cloth for printing, and the four colours are printed in turn through the four different printing templets. The colours are printed one on top of the other on the same glass surface with a prescribed time for drying between each printing. The colours are printed in the following order: yellow, red, blue and black (alternatively brown or dark blure). At this stage in the operation it is very important to keep a close fit, to get the four colours to correspond, and to have the final result be experienced visually as a photography.

When the printing ink has dried the glass article is going to be annealed or fired. It is then placed on a mould with a shape-determining surface, whereby the printed glass surface is turned away from the shaping surface. This can be of arbitrary shape, i.e. essentially plane, or have a desired bending, possibly be double-bent convex-concave. A flat support surface can be put into practice e.g. with a Silimanite-slab or a Ceraform-slab. The support can also be cast, e.g. in plaster, to achieve a desired shaping surface. Such an arbitray shaping surface can also be made from a powder containing pulverized silicates, which is brushed or scattered on said slab to build up the support to desired form. In such a way some parts of the picture can be given a relievo. The glass placed on the mould or the slab is conveyed into a heat treatment kiln or furnace, preferably of what is called a fusing-type with heat emission means only in the furnace top. The mould or the slab can be placed on distance blocks, which are lying on the furnace bottom. There the glass is fired according to prescribed firing schedule, which includes a number of gradual firing sequences as explained in the following. Such a schedule will be described for a bearer glass of 3 mm thickness.

The firing starts at room temperature, and the temperature is risen to magnitude 370° C. to be kept stable there for some minutes, before the temperature rise goes on to more than 500° C. This procedure step is carried on during 135 to 400 minutes, depending on the properties of the bearer glass and the inks.

In a second step of procedure the temperature is risen as fast as possible to at least 700° C., for certain glass qualities to more than 820° C. This high temperature is kept during one to fifteen minutes. Then in a third step the power supply is discontinued, and the furnace temperature is left to a rapid reduction to about 540° C. This temperature drop can take place under forced ventilation of the furnace. The temperature 540° C. will be maintained for e.g. 200 minutes.

The fourth step imply that the temperature reduction continues at the pace the furnace emits heat, possibly with energy addition at 420° C. However, heat should be added to keep the temperature interwal 370° C. during an arbitrary time, e.g. 300 minutes.

In the closing step a certain cooling can be required, to get the furnace in order for next firing within 24 hours from the start of the former.

It should be noted that times and temperatures stated vary depending on the size of the glass article. The steps 2 and 4 will be short, and are intended just to rise and reduce the temperature respectively in the firing furnace. The firing thus include, at least, a relatively long opening sequence 1, a relatively short main sequence 2 and a relatively long closing sequence, with retardation of the temperature reduction between 390° C. and 350° C. The main sequence 2 takes place during a relatively short time of more than one minute, and the temperature shall be at least 700° C.

After the firing the pigment has been melted completely into the top layer of the glass, and the reproduced picture in the glass is thus light and colour solid.

The printing can take place in another number of steps than four, e.g. it can be accomplished in two, three or more steps using a corresponding number of colours.

It ought also to be noted that the applying of inks can be done in another way than the above described printing method, e.g. by other printing methods, or by spraying the said ink or inks on the glass surface by means of at least one nozzle. Such an ink application can be made with the use of a spray equipment such as an ink-jet writer. The picture to be reproduced on the glass surface can first be scanned into a computer and be processed there by a specific program. Accordning to this procedure for ink application suitable inks shall be used. The subsequent firing of the glass article is carried out in the same way as has been indicated above.

The procedure can also be utilized for production of other glass products with reproduced pictures. E.g. a glass pane can be placed on top of an already printed surface, before or after firing with so called fusing. That glass pane can be melted together with the underlaying glass and the colours. Further, the different inks can be printed each on its own glass pane, and those are then burnt together in a parcel with the different glass panes laying one on the other. Those will then melt together.

The invention claimed is:

1. Procedure for reproduction of a photographic picture in an article of glass, where the picture comprises one or more colours, the procedure comprising:
    transferring the picture to a surface of the article, wherein colours are applied to the surface and dried one after another until all colours are applied; and
    firing the article in a kiln, comprising:
        staffing at room temperature and raising the temperature to a first temperature where it is maintained for a first period of time,
        raising the temperature to a second temperature, where it is maintained for a second period of time, the second period of time being sufficient to lower the viscosity of glass such that the colour substances mix with the glass,
        raising the temperature to a third temperature, where it is maintained for a third period of time, the third period of time being sufficient to allow the colouring substances to melt into and beneath an immediate surface of the glass,
        lowering the temperature to a fourth temperature, where it is maintained for a fourth period of time, and
        lowering the temperature to a fifth temperature, where it is maintained for a fifth period of time, after which the temperature is lowered back to room temperature.

2. Procedure according to claim 1, wherein the one or more colours is of a ceramic material.

3. Procedure according to claim 1, wherein the surface where the picture will be placed is free from metal ions.

4. Procedure according to claim 3, wherein the metal ions are stannous ions.

5. Procedure according to claim 1, wherein at least one colour is applied by silk screen printing.

6. Procedure according to claim 1, wherein at least one colour is applied by spraying on the glass surface by means of a nozzle.

7. Procedure according to claim 1, wherein one or more nozzles for colour application are computer controlled.

8. Procedure according to claim 7, wherein the picture is programmed into the computer.

9. Procedure according to claim 1, wherein the picture has been screened with an anti-scatter grid before the transferring to the article.

10. Procedure according to claim 1, wherein the first period of time is at least two minutes.

11. Procedure according to claim 1, wherein the second period of time is at least 135 minutes.

12. Procedure according to claim 1, wherein the third period of time is from about 1 minute to about 15 minutes.

13. Procedure according to claim 1, wherein the fourth period of time is at least 200 minutes.

14. Procedure according to claim 1, wherein the fifth period of time is at least 300 minutes.

15. Procedure according to claim 1, wherein the first temperature is about 370° C.

16. Procedure according to claim 1, wherein the second temperature is at least 500° C.

17. Procedure according to claim 1, wherein the third temperature is at least 700° C.

18. Procedure according to claim 1, wherein the fourth temperature is about 540° C.

19. Procedure according to claim 1, wherein the fifth temperature is about 350° C. to about 390° C.

20. Procedure for reproduction of a photographic picture in an article of glass, where the picture comprises one or more colours, the procedure comprising:

transferring the picture to a surface of the article, where the colours are applied to the surface and dried one after another until all colors are applied; and firing the article in a kiln in the following sequence:
- starting at room temperature, raising the temperature to about 370° C. where it is maintained for at least two minutes;
- raising the temperature to at least 500° C. where it is maintained for at least 135 minutes;
- rapidly raising the temperature to at least 700° C. where it is maintained for one to fifteen minutes;
- rapidly lowering the temperature to about 540° C. where it is maintained for about 200 minutes; and
- slowing lowering the temperature to about 390° C. to about 350° C. where it is maintained for about 300 minutes; and
- lowering the temperature to room temperature.

21. Procedure for reproduction of a photographic picture in an article of glass, where the picture comprises one or more colours, the procedure comprising:
- transferring the picture to a surface of the article, wherein each color is applied one at a time; and
- after all colors have been applied, firing the article at a plurality of temperatures, wherein each of the plurality of temperature is held for a length of time,
- wherein the highest of the plurality of temperatures is determined based on a viscosity of the glass being used,
- wherein the highest of the plurality of temperatures is maintained until all colors have melted into the surface of the article, and
- wherein the pictures has been screened with an anti-scatter grid before the transferring of the picture to the surface of the article.

* * * * *

UNITED STATES PATENT AND TRADEMARK OFFICE
CERTIFICATE OF CORRECTION

| | | |
|---|---|---|
| PATENT NO. | : 7,645,480 B2 | Page 1 of 1 |
| APPLICATION NO. | : 10/598948 | |
| DATED | : January 12, 2010 | |
| INVENTOR(S) | : Ewa Stackelberg et al. | |

It is certified that error appears in the above-identified patent and that said Letters Patent is hereby corrected as shown below:

Column 1, line 16, please replace the word "glas" with --glass--,

Column 1, line 53, please indent before the word "One",

Column 2, line 33, please replace the word "Accordning" with --According--,

Column 3, line 1, please replace the word "Accordning" with --According--,

Column 3, line 40, please replace the word "Accordning" with --According--,

Column 4, line 21, please change the word "illing" to --milling--,

Column 4, line 21, please change the word "apebble" to "a pebble",

Column 4, line 21, please change the word "mll." to --mill.--,

Column 4, line 32, please replace the word "Accordning" with --According--,

Column 5, line 56, please replace the word "Accordning" with --According--,

Column 6, line 9, please replace the word "staffing" with --starting--.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,645,480 B2 | |
| APPLICATION NO. | : 10/598948 | |
| DATED | : January 12, 2010 | |
| INVENTOR(S) | : Stackelberg et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this

Sixteenth Day of November, 2010

David J. Kappos
*Director of the United States Patent and Trademark Office*